(12) United States Patent
Lassota

(10) Patent No.: US 6,705,208 B2
(45) Date of Patent: Mar. 16, 2004

(54) BEVERAGE BREWER WITH AUTOMATIC SAFETY BREW BASKET LOCK AND METHOD

(75) Inventor: Zbigiew G. Lassota, Long Grove, IL (US)

(73) Assignee: Food Equipment Technologies Company, Inc., Lincolnshire, IL (US)

(*) Notice: Subject to any disclaimer, the term of this patent is extended or adjusted under 35 U.S.C. 154(b) by 35 days.

(21) Appl. No.: 10/124,961

(22) Filed: Apr. 18, 2002

(65) Prior Publication Data
US 2003/0000392 A1 Jan. 2, 2003

Related U.S. Application Data
(60) Provisional application No. 60/284,728, filed on Apr. 18, 2001.

(51) Int. Cl.[7] .............................. A47J 31/00
(52) U.S. Cl. ................... 99/280; 99/285; 99/290; 426/433
(58) Field of Search ............... 99/280, 281, 282, 99/283, 285, 290, 323, 304, 305, 306, 307; 426/433, 435

(56) References Cited

U.S. PATENT DOCUMENTS

| 3,343,478 | A | * | 9/1967 | Hausam | 99/283 |
| 5,245,914 | A | * | 9/1993 | Vitous | 99/280 |
| 6,439,105 | B1 | * | 8/2002 | Ford | 99/280 |

* cited by examiner

Primary Examiner—Reginald L. Alexander
(74) Attorney, Agent, or Firm—James W. Potthast; Potthast & Associates

(57) ABSTRACT

A beverage brewer (20) with a brew basket sensor (48) that senses when the brew basket is fully mounted to a brew basket mount (38) to enable initiation of a brew cycle. A controller 14 responds to the brew basket sensor (48) and internal programming that times the brew cycle including the drip period to actuate an automatic remote controlled brew basket lock (50) to lock the brew basket to the mount (38) during the entire brew cycle. After the brew cycle is over, the lock is automatically deactuated to enable release of the brew basket (40)

32 Claims, 6 Drawing Sheets

BEVERAGE BREWER WITH AUTOMATIC SAFETY BREW BASKET LOCK AND METHOD

CROSS REFERENCE TO RELATED APPLICATION

This application claims the benefit of U.S. provisional application Ser. No. 60/284,728 filed Apr. 18, 2001, under 35 U.S.C. 119(e).

BACKGROUND OF THE INVENTION

1. Field of the Invention

This invention generally relates to electrical hot beverage brewers, such as coffee brewers, and more particularly to such beverage brewers that employ removably mounted brew baskets.

2. Discussion of the Prior Art

Electrical, commercial, beverage brewers of the type that have a controller that automatically controls a plurality of brewer elements are well known. These brewer elements include a hot water reservoir, a brew valve, or dispense valve, and a fill valve to initially fill the reservoir and to also add water after water is removed through a brew valve to pass over and through ingredient, such as ground coffee beans or ground tea or tea leaves, are well known. These elements are all contained within a housing to which is attached a removable brew basket mounting mechanism to which a brew basket is removably mounted during the brewing cycle. The brew basket has a filter holder for supporting a paper filter within which the ingredient is contained. The brew basket has an open top and inwardly tapers downwardly to a beverage outlet opening.

During a brew cycle, the brew valve is opened for a preselected time period corresponding to the desired quantity of beverage to be brewed to pass hot water from the reservoir to a spray head that sprays the hot water through the open top of the brew basket and onto the beverage ingredient. The beverage ingredient is contained within a disposable filter paper that in turn is supported within the brew basket by means of a wire filter holder. The hot water seeps through the ingredient and dissolves portions of the ingredient to make the hot beverage that passes through the filter paper supported by the filter holder, through the brew basket outlet opening and into an urn that is positioned beneath the brew basket outlet opening.

After the brew valve is closed at the end of a dispense period of the brew cycle, water remains in the brew basket that has not yet drained entirely through the ingredient. This period of the brew cycle is referred to as the drip period. After conclusion of the drip period, most of all the water that will pass through the ingredient and not be absorbed by the ingredient has passed through the ingredient and the dripping of the beverage out of the brew basket outlet opening substantially stops. The entire brew cycle then ends with the end of the drip period At the end of the brew cycle, the brew basket may be slid out of supportive engagement with the brew basket mounting and away from its operative position beneath the brew valve to remove the depleted ingredient and the filter paper in which it is contained for disposal. A new filter paper is inserted and fresh ingredient added to the new filter paper.

It has been known for users of this type of brewer, because of being in a rush to quickly start a new brew cycle, or otherwise due to inattentiveness, to remove the brew basket before the end of the brew cycle. This can result in scalding beverage dripping onto the user or onto a counter or floor as well as hot water being dispensed directly onto and splashing onto the top of the urn and elsewhere. Such circumstance can cause injury due to burns or slipping on spilled water and in the least, alters the intended strength and thus taste of the brewed beverage by reducing the quantity of weaker beverage that passes from the ingredient at the end of the brew cycle.

SUMMARY OF THE INVENTION

In accordance with the present invention this disadvantage of known brewers is overcome by automatically selectively actuating a locking mechanism that locks the brew basket into the operative position beneath the brew valve at the start of the brew cycle when in the operative position.

This objective is achieved by providing in a beverage brewer having a water tank, a brew basket for holding beverage ingredient to be mixed with the water from the water tank, a housing, means for mounting the brew basket for removal from an operative position in which the brew basket safely funnels beverage to a container and an inoperative position removed from the brewer housing and a remote controlled brew valve that selectively passes water from the water tank to the brew basket, and a safety brew basket lock assembly composed of an automatic lock mechanism for selectively locking the brew basket to the housing in the operative position when the brew basket is in the operative position, and a controller responsive to actuation of the start switch to actuate the automatic lock mechanism to prevent removal of the brew basket from the housing during a preselected time period after actuation of the start switch The objective is also obtained by providing in a beverage brewer having a water tank, a brew basket for holding beverage ingredient to be mixed with the water from the water tank, a housing, means for mounting the brew basket for removal from an operative position in which the brew basket funnels beverage to an urn and an inoperative position removed from the brewer housing and a remote controlled brew valve that selectively passes water from the water tank to the brew basket, a safety brew basket lock assembly having a sensor that senses when the brew basket is not in the operative position for making beverage and passing the beverage to a container, an automatic lock mechanism that locks the brew basket to the housing in the operative position when the brew basket is in the operative position and the lock mechanism is actuated, said lock mechanism blocking, if actuated, blocking placing the brew basket in the operative position, and a controller responsive to the sensor to disable the lock mechanism when the brew basket is removed from the operative position to enable placement of the brew basket into the operative position.

The objective is obtained also in part by providing in a beverage brewer having a water tank, a brew basket for holding beverage ingredient to be mixed with the water from the water tank, a housing, means for mounting the brew basket for removal from an operative position in which the brew basket safely funnels beverage to a container and an inoperative position removed from the brewer housing and a remote controlled brew valve that selectively passes water from the water tank to the brew basket in response to actuation of a brew start switch, a safety method of brewing by performing the steps of automatically selectively locking the brew basket to the housing in the operative position when the brew basket is in the operative position, and responding to actuation of the start switch to actuate the automatic lock mechanism to prevent removal of the brew basket from the housing during a preselected time period after actuation of the start switch Also, the objective is achieved by providing in a beverage brewer having a water tank, a brew basket for holding beverage ingredient to be mixed with the water from the water tank, means for mounting the brew basket for removal from an operative position in which the brew basket funnels beverage to an urn and an inoperative position removed from the brewer housing and a remote controlled brew valve that selectively passes water from the water tank to the brew basket, a safety method performed by sensing when the brew basket is not in the operative position for making beverage and passing the beverage to a container, selectively locking the brew basket to the housing in the operative position with an automatic lock when the brew basket is in the operative position, controlling the lock mechanism in response to the sensor to disable the lock mechanism when the brew basket is removed from the operative position.

BRIEF DESCRIPTION OF THE DRAWINGS

The foregoing advantageous features and objects of the present invention will be described in detail and others will be made apparent in the detailed description of the preferred embodiment of the safety brewer that is given with reference to the several figures of the drawing, in which.

DETAILED DESCRIPTION

Figure 1:
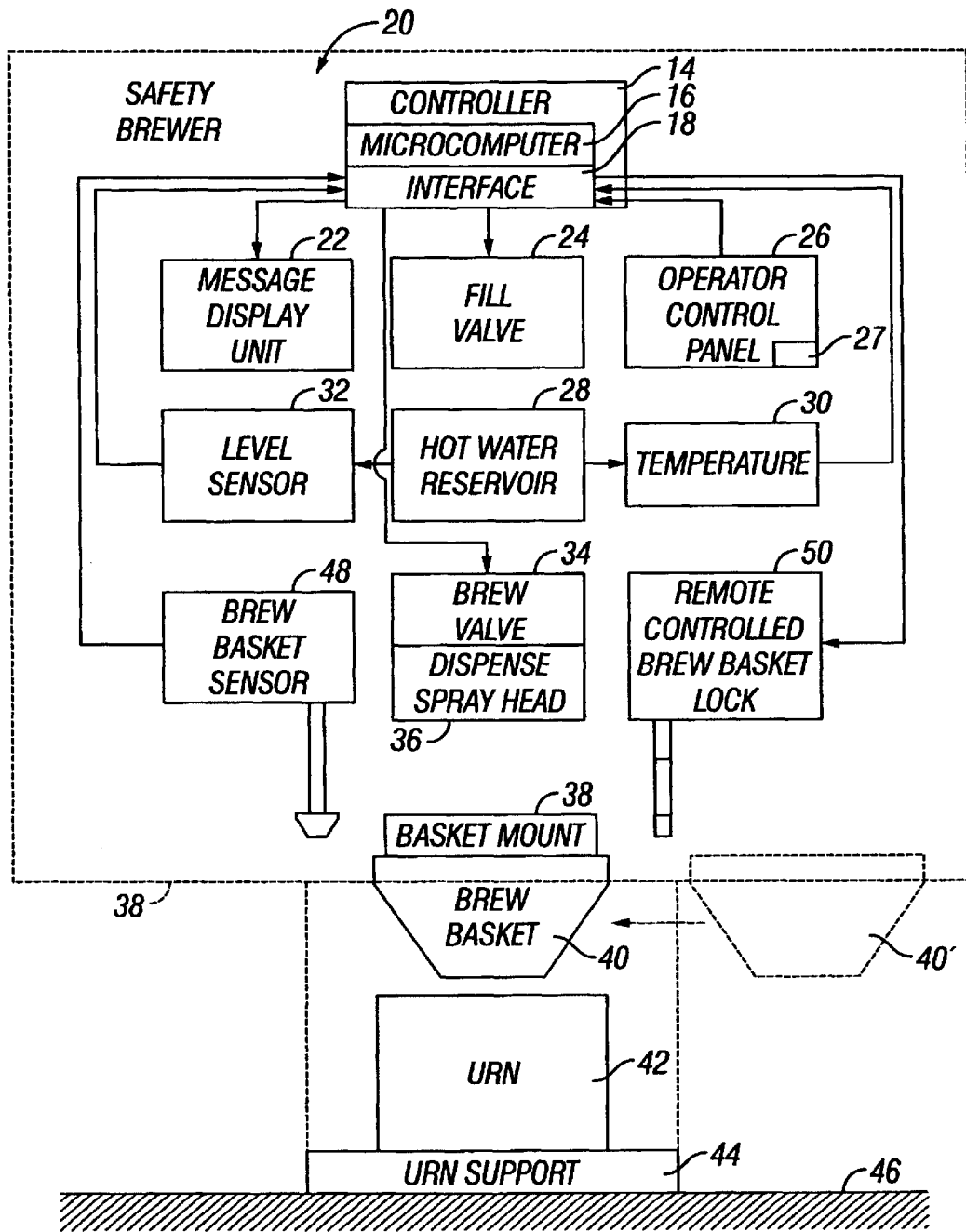
FIG. 1 is a functional block diagram of the preferred embodiment of the safety brewer of the present invention.

Referring to FIG. 1, the preferred embodiment of the safety brewer 20 of the present invention is seen to include a number of generally conventional elements in addition to novel elements that enable the achievement of the objects of the invention. The conventional elements are the controller 14 with a microcomputer 16 and an interface 18. The interface connects the computer 16 with a number of conventional elements: a message display unit 22, a fill valve 24, an operator control panel 26, a temperature sensor 30 that senses the temperature of the hot water in a hot water reservoir 28, a level sensor 32 that senses the level of the water in the reservoir 28, a brew valve 34, a dispense spray head 36 connected to the outlet side of the brew valve 34 and a housing 38 that contains all of the above elements.

Attached to an underside of the housing is a basket mount 38 that removeably mounts the removable brew basket 40 in a operative position beneath the dispense spray head 36 and above an urn 42 and an urn support 44, if any. In some cases there is no urn support 44, and the brew basket is supported over a counter top or table top 46 by a support for the housing that allows the urn to rest on the underlying surface counter top 48 or the like.

These conventional elements form no part of the present invention, and reference may be made to U.S. Pat. No. 5,000,082 issued to Lassota on Mar. 19, 1991 for "Beverage Maker and Method of Making Beverage"; U.S. Pat. No. 5,331,885 issued to Lassota on Jul. 26, 1994 for "Semiautomatic Beverage Maker and Method"; U.S. Pat. No. 5,943,944 issued to Lassota on Aug. 31, 1999, for "Brewing System with Hot Water Urn Flushing Apparatus"; U.S. Pat. No. 5,953,981 issued to Lassota on Sep. 21, 1999; and patents cited therein, hereby incorporated by reference, for further information concerning such standard features.

In accordance with the invention, when the brew basket 40 is loaded with ingredient and then moved from the inoperative position, shown in broken line 40', to the operative position, shown in solid line, a brew basket sensor 48 detects the presence of the brew basket 40. A detection signal is sent from the brew basket sensor 48 to the microcomputer 16 through the interface 18. In response to this brew basket detection signal, the microcomputer 16, through the interface 18, sends a lock signal to a remote controlled brew basket lock 50. The remote controlled brew basket lock is actuated by the lock signal to lock the brew basket 40 in the operative position, as shown in solid line and as described above. The microcomputer 16 keeps the brew basket locked into position until the end of the brew cycle, including the drip period.

Figure 2:
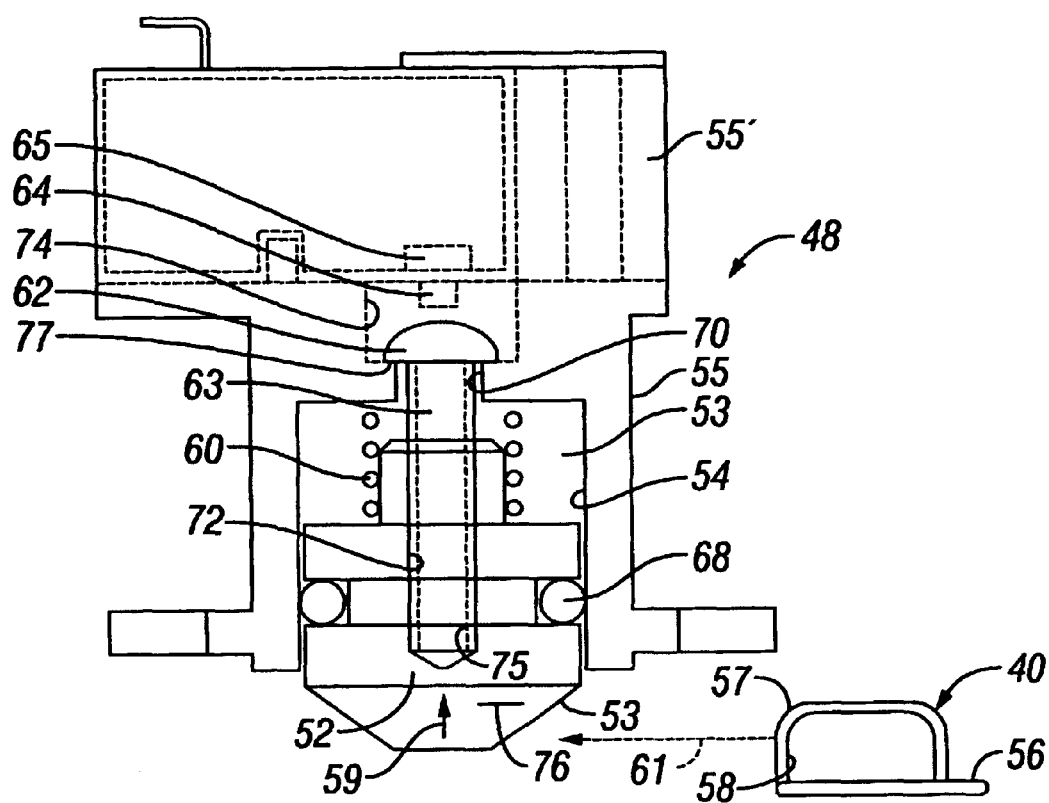
FIG. 2 is a sectional side elevation view of the brew basket sensor assembly that senses when the brew basket has been placed into the operative position beneath the brew valve.

Referring to FIG. 2, the brew basket sensor assembly 48 is preferably an electromechanical sensor that includes a plunger 52 that is mounted for sliding movement within a bore 53 in a sensor housing 55. The top 56 of the brew basket 40 carries a sensor engagement member 58 that engages the plunger 52 when it is moved into operative position. The plunger 52 carries a beveled cam surface 53 that is laterally engaged by a convex surface 57 of the engagement member 58 when the brew basket is laterally slid along parallel, spaced rails of the brew basket mount 38 in the direction of horizontal arrow 61. This lateral engagement cams the plunger 52 upwardly in the direction of arrow 59 against a resilient downward force provided by a spiral bias spring 60. The upper end of the plunger 52 carries a switch engagement member 62 that is pushed against a switch actuator 64 of a switch 65 contained in an upper part 55' of the sensor housing 55.

Figure 3A:
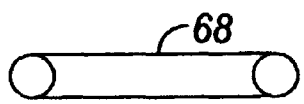
FIG. 3A is a sectional side view of an O-ring that is employed with the sensing plunger of the brew basket sensor assembly of FIG. 2.
Figure 3B:
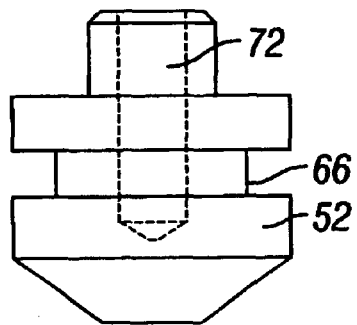
FIG. 3B is a side view, partially in section, of the sensing plunger of the sensor assembly of FIG. 2.

As best seen in FIGS. 3A and 3B, the plunger 52 has an annular groove 66 within which is mounted an O-ring, annular seal 68. The O-ring seal 68 resiliently presses against the interior cylindrical surface 54 of the bore 53 within which the plunger 52 slides up and down to create a moisture and steam impervious seal. This seal between the plunger 52 and the inside surface 54 of the bore 53 protects the upper part of the housing 55' containing the switch actuator 64, switch 65 and the controller 14 against moisture and steam coming off of the open top of the brew basket 40 during brewing.

The hemispherical switch engagement member 62 is mounted at the upper end of an elongate pin body 63. The pin body 63 is received through a narrowed passageway 70 that is in open communication with an upper portion of the bore 53 located above the plunger 52. The body of the elongate pin 63 is adjustably mounted within an internally threaded pinhole 72 of the plunger 52 by means of a mating external screw threads 75 on the distal end of the elongate pin 63. The diameter of the switch engagement member 62 is larger than that of the body of the elongate pin 63 to form a shoulder 77. This shoulder is wider than the diameter of the pin hole and engages the horizontal surface surrounding the top of the pinhole 70 to block the downward sliding removal of the pin 62' and the plunger 52 from without the bore 54. When the sensor engagement member 58 carried by the brew basket 40 is not engaged with the plunger 52, the bias spring 60 that surrounds the pin 63 resiliently presses the top of the plunger 52 downwardly to the position shown in FIG. 2. As seen, in this position the shoulder 77 at the bottom of the hemispherical engagement member 62 abuts the bottom of a bore 74 surrounding the opening to the pinhole, or passageway. When the sensor engagement member 58 slid to a position directly beneath the bottom of the plunger 52, it supports the bottom of the plunger at the level 76, and the sensor detection member 62 is elevated a like amount and thereby pushed against the switch actuator 64 of the switch 65. When the brew basket is removed, then the spring 60 returns the plunger 52 from level 76 to the level shown in FIG. 2, and the switch engagement member 62 is moved downwardly to the position shown in FIG. 2 at which it is no longer engagsing the switch actuator 64.

Figure 4:
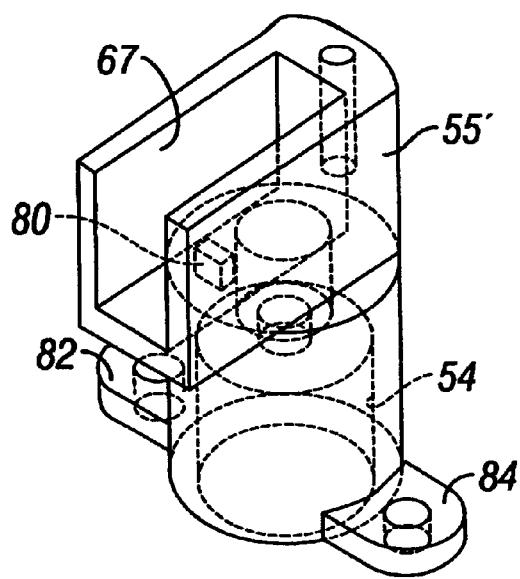
FIG. 4 is a transparent, perspective view of the plunger housing of the sensor assembly of FIG. 2 within which is received the sensor plunger of FIG. 3B.
Figure 5A:
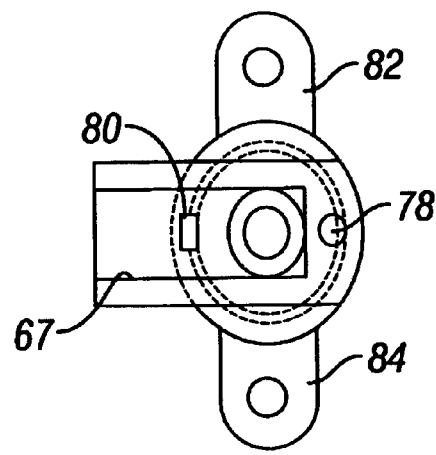
FIGS. 5A and 5B are plan and side elevation views of the sensor housing.
Figure 5B:
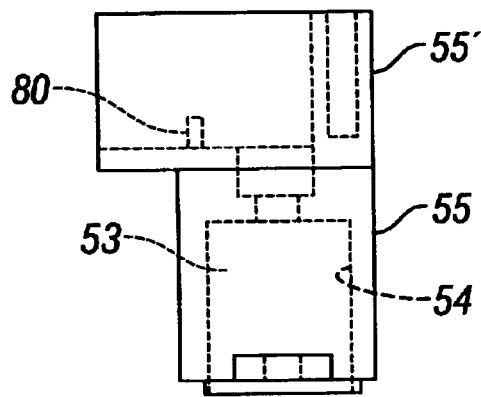
Figure 6:
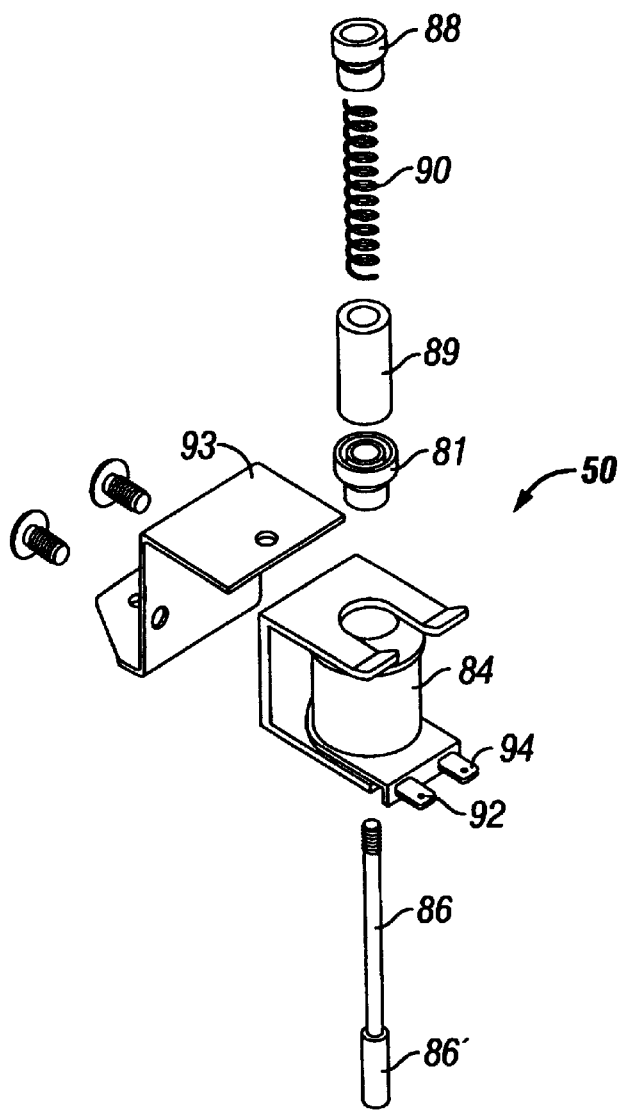
FIG. 6 is an exploded perspective view of the brew basket automatic lock assembly.
Figure 7:
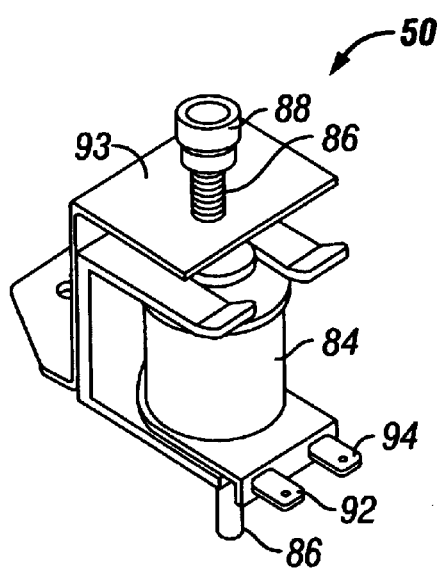
FIG. 7 is a perspective view of the automatic lock assembly of FIG. 6 when assembled.

Referring to FIGS. 4, 5A and 5B, the upper part 55' of the housing is seen to have a rectilinear slot 67 with an open top that is integrally molded together with the lower part of the housing 55. The slot extends radially beyond the cylindrical lower housing 55 and protectively contains a box-like switch housing 80 of the switch 65. As also seen, the lower housing 55 has a pair of radially opposed mounting tabs 82 and 84 with mounting holes located above the highest level that can be reached by the plunger 52. Referring now to FIGS. 6 and 7, the preferred implementation of the remote controlled brew basket lock 50 is seen to comprise a solenoid coil 84 with a metal locking pin 86 mounted for sliding movement within a central air core about which the coil 84 is wrapped. The locking pin 86 is supported within the core by means of a threaded nut 88 that fastens to the top of the pin 86. The threaded nut secures a spiral bias spring 90 that is wrapped around the body of the pin 86 outside of the core. A cylindrical grommet 89 is received within the core and, in turn, snugly receives the locking pin 86 within a central, cylindrical passageway. A retainer 91 is mounted into the core that also snugly fits around the pin 86 and which abuts an enlarged portion 86' of the pin 86 at the locking end to prevent removal of the pin 86 upwardly out of the core. The coil spring acts 90 between the nut 88 and a bracket 93 overlying the core to spring bias the pin 86 toward an upward position in which the brew basket 40 is not locked.

The two ends of the coil 84 are attached to electrical connectors 92 and 94. When electrical power is applied to the connectors by the computer 16 to lock the brewer 20, the pin 86 is caused to move downwardly against the force of the bias spring until it is stopped from further downward movement by the head of nut 88 abutting against the top of the bracket 94. The pin 86 remains in the downwardly extending locking position in which it blocks sliding removal of the brew basket from basket mount 38 until the coil 86 is de-energized. When the coil is de-energized the bias spring 90 is enabled to return the pin 86 to the elevated non-locking position. Preferably, the pin extends into the interior of the brew basket adjacent the top of the back inner side of the brew basket to prevent removal. Alternatively, when in the locking position, the bottom of the pin 86 extends into a mating hole in the top edge of the brew basket 40 to block sliding removal of the brew basket 40.

Figure 8:
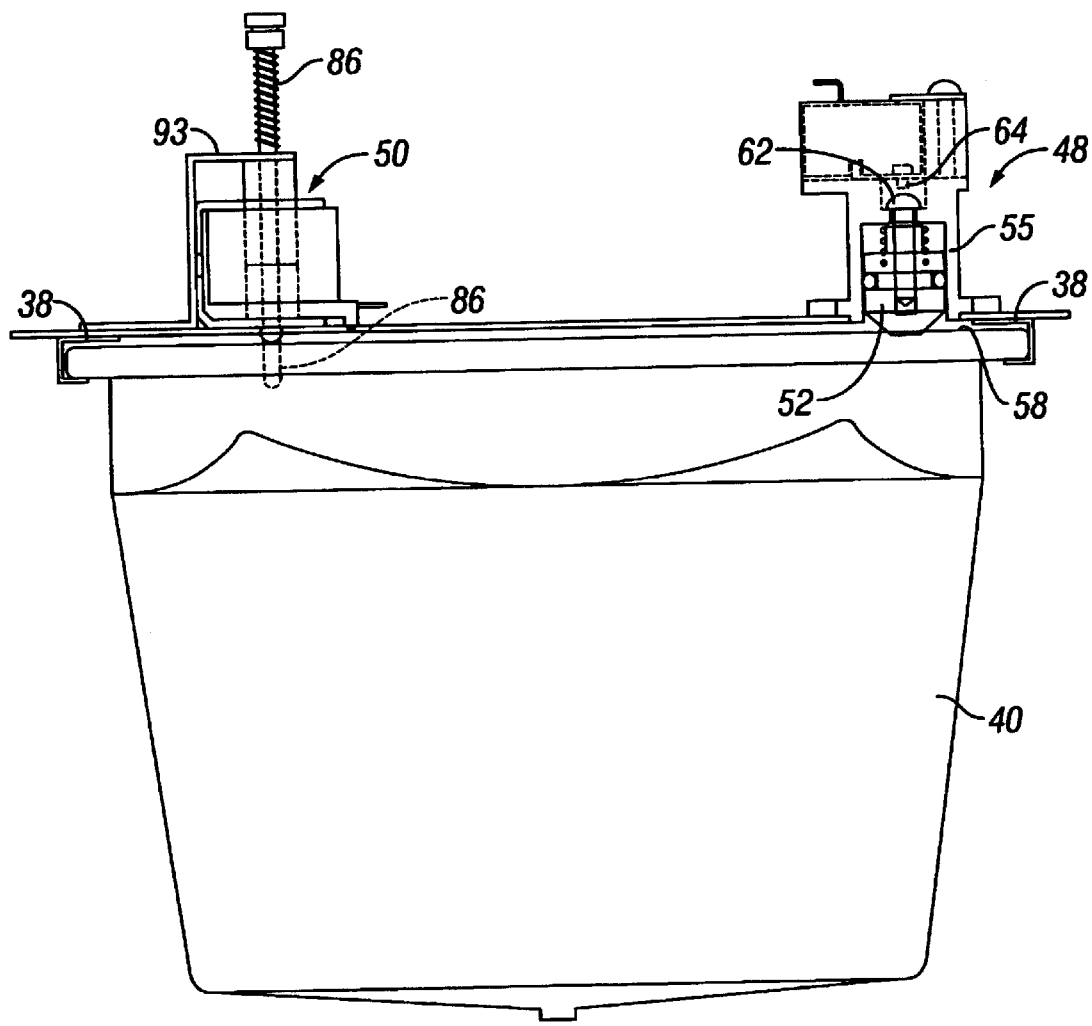
FIG. 8 is a sectional side view showing the brew basket engaging the sensor mechanism and locked into the operative position.

Referring now to FIG. 8, it is seen how the brew basket engages the brew basket sensor 48 and the pin 86 locks the brew basket in the operative position by blocking its removal from the basket mount 38. Preferably, the pin member 86 enters into the open brew basket and thereby blocks the back side against sliding removal from the mount 38 when the sensor 52 is pushed upwardly in the position shown by the back side of the upper edge of the brew basket 40.

Figure 9:
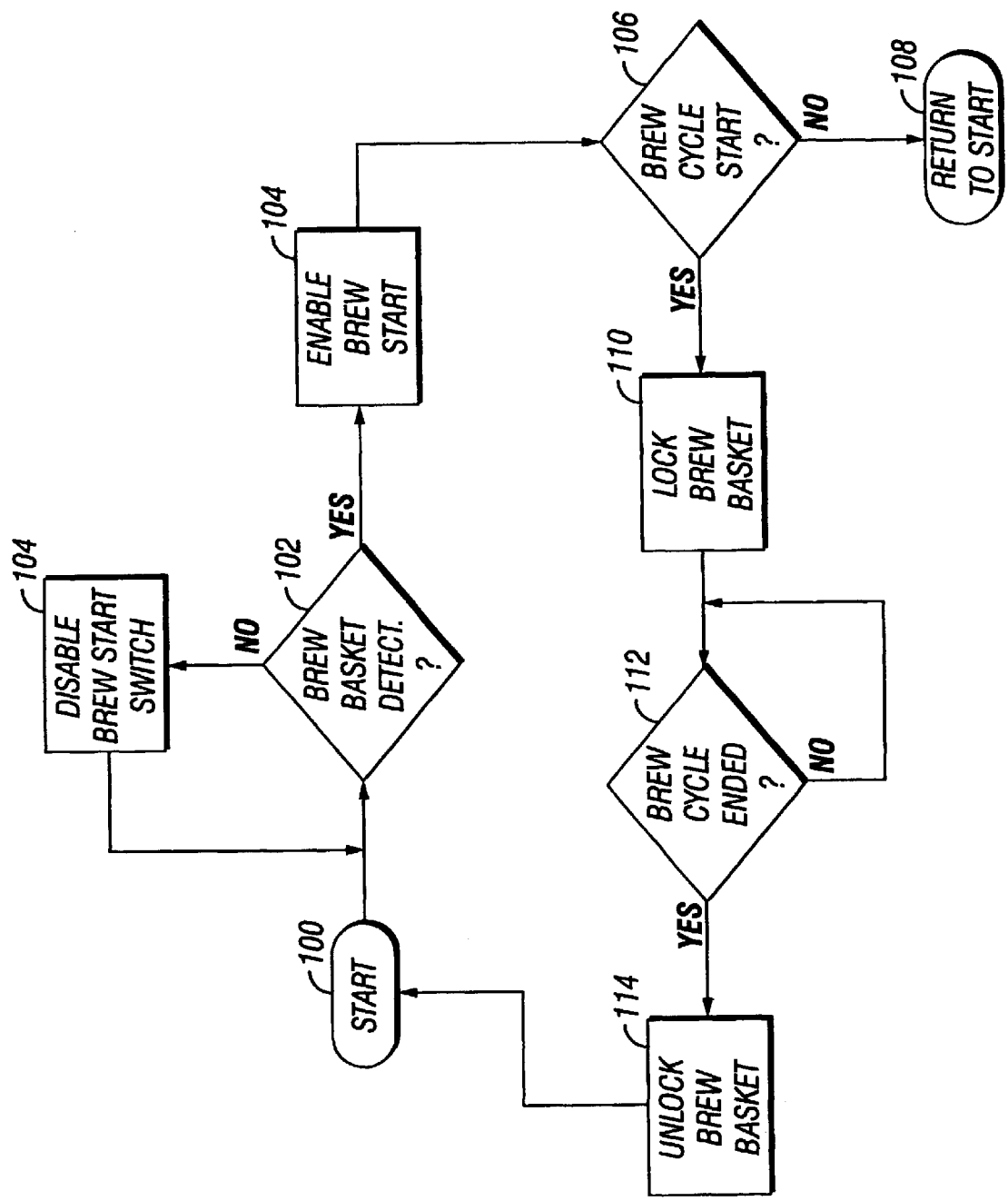
FIG. 9 is a flow chart of the portion of the computer program installed in the controller computer of FIG. 1 that controls the brew basket lock mechanism of FIGS. 6 and 7 in response to signals from the brew basket sensor assembly, a start brew switch actuation and the internal timing of the computer to measure the duration of a brew cycle, once initiated by actuation of a start brew switch.

Referring now to FIG. 9, a flow chart of the portion of the computer program that is installed in the microcomputer 16 to control the locking and unlocking of the brew basket is shown. After start of the subroutine in step 100, a determination is made in step 102 as to whether the brew basket 40 is detected as being mounted in the operative position. If the brew basket 40 is not detected, then in step 104, the brew start switch 27 of the operator control panel 26 is disabled from starting a brew cycle even if actuated. If the brew basket is detected in step 102, then in step 104, the brew start switch 27 is enabled to initiate a new brew cycle. Then, in step 106, a determination is made as to whether a brew start switch 27 has been actuated to start a new brew cycle. If not, then the program returns in step 108 to the start 100 and the program recycles. If a brew start switch 27 has been actuated, then in step 110, the brew basket 40 is locked in place by the remote controlled brew basket lock 50. Next, in step 112 a determination is made as to whether the brew cycle, including the drip period, as lapsed. The brew cycle has last a preselected time after actuation of the brew start switch 27, and the determination of completion of the brew cycle is made by measuring the time until the preselected time period has lapsed. If the brew cycle time has lapsed, the brew basket remains locked. If the brew cycle has ended, then the brew basket is unlocked in step 114. The program then returns to start 100 of this portion of the control. In addition, as an extra precaution, even if the brew cycle has lapsed, the status of the brew cycle is checked and even the brew cycle period has lapsed, if the brew valve is open for any reason, the brew basket will remain locked.

While a detailed disclosure has been made of the preferred manner of implementing the application, it should be appreciated that many variations of the details may be made without departing from the scope of the invention that is set forth in the appended claims. For instance, while the particular form of the locking mechanism and the basket sensor have obvious advantages, other locking mechanisms and detectors of greater or lesser complexity may be employed while still obtaining the safety features of the invention. Reference should therefore be made to the appended claims.

What is claimed is:

1. In a beverage brewer having a water tank, a brew basket for holding beverage ingredient to be mixed with the water from the water tank, a housing, means for mounting the brew basket for removal from an operative position in which the brew basket safely funnels beverage to a container and an inoperative position removed from the brewer housing and a remote controlled brew valve that selectively passes water from the water tank to the brew basket, the improvement being a safety brew basket lock assembly, comprising:
- an automatic lock mechanism for selectively locking the brew basket to the housing in the operative position when the brew basket is in the operative position; and
- a controller responsive to actuation of the start switch to actuate the automatic lock mechanism to prevent removal of the brew basket from the housing during a preselected time period after actuation of the start switch.

2. The brewer of claim 1 including means for disabling the start switch from starting a brew cycle in response to the sensor sensing that the brew basket in not in the operative position.

3. The brewer of claim 2 in which the controller includes means for automatically unlocking the brew basket upon determination that a brew cycle has lapsed but only if the brew valve is not open.

4. The brewer of claim 1 in which the controller includes means for actuating the lock mechanism in response to actuation of the start switch but only if the sensor senses that the brew basket is in the operative position.

5. The brewer of claim 4 including means to automatically disable the lock mechanism at the end of a brew cycle to enable removal of the brew basket and placement of a new brew basket into the operative position.

6. In a beverage brewer having a water tank, a brew basket for holding beverage ingredient to be mixed with the water from the water tank, a housing, means for mounting the brew basket for removal from an operative position in which the brew basket funnels beverage to an urn and an inoperative position removed from the brewer housing and a remote controlled brew valve that selectively passes water from the water tank to the brew basket, the improvement being a safety brew basket lock assembly, comprising:
- a sensor that senses when the brew basket is not in the operative position for making beverage and passing the beverage to a container;
- an automatic lock mechanism that locks the brew basket to the housing in the operative position when the brew basket is in the operative position and the lock mechanism is actuated, said lock mechanism blocking, if actuated, removal of the brew basket from the operative position; and
- a controller responsive to the sensor to disable the lock mechanism when the brew basket is removed from the operative position to enable placement of the brew basket into the operative position.

7. The beverage brewer of claim 6 in which
- the sensor includes a plunger member that is mounted for sliding movement within a bore within a sensor housing, and
- a top of the brew basket carries a sensor engagement member that engages the plunger member when the brew basket is moved to an operative position.

8. The brewer of claim 7 in which the plunger carries a beveled cam surface that is laterally engaged by a convex surface of the engagement member when the brew basket is laterally slid into the operative position.

9. The brewer of claim 8 in which engagement of the sensor engagement member by the plunger member cams the plunger member upwardly against a resilient force from a spring member.

10. The brewer of claim 8 including a brew basket mount with parallel, spaced rails along which the brew basket is slid into operative position.

11. The brewer of claim 7 in which the plunger member has an upper end with a switch engagement member that is pushed against a switch actuator of a switch contained in an upper part of the sensor housing.

12. The brewer of claim 7 in which
- the plunger has an annular groove within which is mounted an O-ring, annular seal and the bore has an interior cylindrical surface within which the plunger is slidably mounted, and
- the O-ring resiliently presses against the interior cylindrical surface to create a moisture and steam impervious seal.

13. The brewer of claim 12 in which the O-ring protects an upper part of the sensor housing that contains the switch actuator, the switch and a controller against moisture and steam coming off an open top of the brew basket.

14. The brewer of claim 7 in which
- the locking mechanism includes a locking pin mounted for sliding movement between a locking position in which the pin extends into the brew basket adjacent a top of an a back inner side of the brew basket to prevent removal, and
- a non-locking position in which pin is withdrawn from the interior of the brew basket.

15. The brewer of claim 14 in which
- the locking pin is controlled by a solenoid when energized to move the locking pin to the locking position, and including
- a bias spring for returning the pin to the non-locking positions.

16. The brewer of claim 7 in which
- the lock mechanism includes a locking pin mounted for sliding movement between a locking position in which the pin extends into a mating hole in a top edge of the brew basket to block sliding removal of the brew basket from the operative position, and
- a non-locking position in which the locking pin is removed from the mating hole.

17. In a beverage brewer having a water tank, a brew basket for holding beverage ingredient to be mixed with the water from the water tank, a housing, means for mounting the brew basket for removal from an operative position in which the brew basket safely funnels beverage to a container and an inoperative position removed from the brewer housing and a remote controlled brew valve that selectively passes water from the water tank to the brew basket in response to actuation of a brew start switch, the improvement being a safety method of brewing, comprising the steps of:
- automatically selectively locking the brew basket to the housing in the operative position when the brew basket is in the operative position; and
- responding to actuation of the start switch to actuate the automatic lock mechanism to prevent removal of the brew basket from the housing during a preselected time period after actuation of the start switch.

18. The method of claim 17 including the step of disabling the start switch from starting a brew cycle in response to the sensor sensing that the brew basket in not in the operative position.

19. The method of brewer of claim 18 including the step of automatically unlocking the brew basket upon determination that a brew cycle has lapsed but only if the brew valve is not open.

20. The method of claim 17 including the step of actuating the lock mechanism in response to actuation of the start switch but only if the sensor senses that the brew basket is in the operative position.

21. The method of claim 20 including the step of automatically disabling the lock mechanism at the end of a brew cycle to enable removal of the brew basket and placement of a new brew basket into the operative position.

22. In a beverage brewer having a water tank, a brew basket for holding beverage ingredient to be mixed with the water from the water tank, means for mounting the brew basket for removal from an operative position in which the brew basket funnels beverage to an urn and an inoperative position removed from the brewer housing and a remote controlled brew valve that selectively passes water from the water tank to the brew basket, the improvement being a safety method, comprising the steps of:

sensing when the brew basket is not in the operative position for making beverage and passing the beverage to a container;

selectively locking the brew basket to the housing in the operative position with an automatic lock when the brew basket is in the operative position;

controlling the lock mechanism in response to the sensor to disable the lock mechanism when the brew basket is removed from the operative position.

23. The method of claim 22 in which the sensor includes a plunger member slid within a bore within a sensor housing, and a top of the brew basket carries a sensor engagement member that engages the plunger member when the brew basket is moved to an operative position.

24. The method of claim 23 in which the plunger carries a beveled cam surface that is laterally engaged by a convex surface of the engagement member when the brew basket is laterally slid into the operative position.

25. The method of claim 24 the step of mounting the brew basket into the operative position by sliding the brew basket on parallel, spaced rails of a brew basket mount.

26. The method of claim 25 including the step of engaging the sensor engagement member by the plunger member to cam the plunger member upwardly against a resilient force from a spring member.

27. The method of claim 26 including the step of protecting with the O-ring an upper part of the sensor housing that contains the switch actuator, the switch and the controller against moisture and steam coming off an open top of the brew basket.

28. The method of claim 23 in which the plunger member has an upper end with a switch engagement member and including the step of pushing the switch engagement member against a switch actuator of a switch contained in an upper part of the sensor housing.

29. The method of claim 23 the plunger has an annular groove within which is mounted an O-ring, annular seal and the bore has an interior cylindrical surface within which the plunger is slid, and including the step of resiliently pressing the O-ring against the interior cylindrical surface when the plunger is slid within the bore to create a moisture and steam impervious seal.

30. The method of claim 29 including the steps of controlling with an energized solenoid the locking pin to move the locking pin to the locking position, and including returning the pin to the non-locking positions with a bias spring when the solenoid is not energized.

31. The method of claim 23 including the step of sliding a locking pin of the lock mechanism between a locking position in which the pin extends into the brew basket adjacent a top of an a back inner side of the brew basket to prevent removal, and a non-locking position in which pin is withdrawn from the interior of the brew basket.

32. The method of claim 23 including the steps of sliding the lock mechanism for movement between a locking position in which the pin extends into a mating hole in a top edge of the brew basket to block sliding removal of the brew basket from the operative position, and a non-locking position in which the locking pin is removed from the mating hole.

* * * * *